US012762808B2

(12) United States Patent
Hamilton

(10) Patent No.: US 12,762,808 B2
(45) Date of Patent: Oct. 13, 2026

(54) SYSTEM AND METHOD FOR VISUALIZING USER INTERACTIONS WITH HYPER-REALISTIC DIGITAL REPLICAS IN IMMERSIVE VIRTUAL ENVIRONMENTS

(71) Applicant: Mark Hamilton, Dover, DE (US)

(72) Inventor: Mark Hamilton, Dover, DE (US)

( * ) Notice: Subject to any disclaimer, the term of this patent is extended or adjusted under 35 U.S.C. 154(b) by 308 days.

(21) Appl. No.: 18/675,146

(22) Filed: May 28, 2024

(65) Prior Publication Data

US 2025/0371812 A1 Dec. 4, 2025

(51) Int. Cl.

| | |
|---|---|
| ***G06T 19/00*** | (2011.01) |
| ***A63F 13/655*** | (2014.01) |
| ***A63F 13/86*** | (2014.01) |
| ***G06V 10/82*** | (2022.01) |
| ***G06V 40/20*** | (2022.01) |

(52) U.S. Cl.

CPC .......... *G06T 19/006* (2013.01); *A63F 13/655* (2014.09); *A63F 13/86* (2014.09); *G06V 10/82* (2022.01); *G06V 40/20* (2022.01); *G06T 2219/024* (2013.01)

(58) Field of Classification Search

CPC . G06T 19/006; G06T 2219/024; G06V 10/82; G06V 40/20

See application file for complete search history.

(56) References Cited

U.S. PATENT DOCUMENTS

| | | | | |
|---|---|---|---|---|
| 8,145,998 | B2 * | 3/2012 | Leahy | A63F 13/12 715/756 |
| 11,024,065 | B1 * | 6/2021 | Baron | G06T 11/60 |
| 11,282,208 | B2 * | 3/2022 | Cohen | G06T 3/4046 |
| 12,002,150 | B2 * | 6/2024 | Zhao | G06T 15/506 |
| 12,555,253 | B2 * | 2/2026 | Chen | G06T 7/254 |
| 2024/0112394 | A1 * | 4/2024 | Neal | G06F 3/011 |
| 2024/0346792 | A1 * | 10/2024 | Kundu | G06T 7/73 |
| 2025/0316000 | A1 * | 10/2025 | Howard | G06F 16/958 |
| 2025/0371812 | A1 * | 12/2025 | Hamilton | G06T 19/006 |

* cited by examiner

*Primary Examiner* — Cheng Yuan Tseng

(74) *Attorney, Agent, or Firm* — Sam Pierce

(57) ABSTRACT

The present invention provides a method and system for visualizing a user interacting with a hyper-realistic digital replica of a content creator in an immersive virtual environment. The system captures a real-time video feed of the user, identifies key variables such as body position and movements using neural networks, and removes the background to isolate the user's image. The isolated image is imported into a virtual environment where the user interacts with the digital replica. The system tracks the user's movements, provides real-time feedback, and records interactions for sharing on social media. The invention leverages advanced technologies to create a highly immersive, interactive, and personalized experience for users engaging with digital replicas of their favorite content creators.

17 Claims, 10 Drawing Sheets

SYSTEM AND METHOD FOR VISUALIZING USER INTERACTIONS WITH HYPER-REALISTIC DIGITAL REPLICAS IN IMMERSIVE VIRTUAL ENVIRONMENTS

BACKGROUND

The present invention relates generally to the field of interactive virtual environments and, more specifically, to systems and methods for visualizing users interacting with hyper-realistic digital replicas of content creators in immersive virtual environments.

In recent years, there has been a growing demand for more personalized and engaging interactions between fans and their favorite celebrities, influencers, and content creators. However, providing such experiences at scale has been challenging due to logistical constraints and limited access to these high-profile individuals.

Existing solutions in the field of interactive virtual environments have attempted to address this issue by enabling users to interact with computer-generated avatars or digital representations of content creators. For example, the system described in U.S. Pat. No. 8,145,998 B2 provides a scalable architecture for a three-dimensional, multi-user, interactive virtual world system where users can interact with avatars representing other users. However, these avatars often lack the hyper-realistic appearance and movements necessary to create a truly immersive and authentic experience.

Moreover, current interactive virtual environment systems typically rely on generic, pre-programmed avatar movements and interactions, which fail to capture the unique mannerisms, personality, and style of the content creators they represent. This limitation diminishes the overall user experience and engagement. Another drawback of existing solutions is the lack of real-time feedback and guidance provided to users as they interact with digital avatars. Without personalized feedback on their performance or progress, users may struggle to fully engage with the content and achieve their desired goals, such as learning a new skill or improving their technique.

Furthermore, the ability to capture and share highlights of user interactions within the virtual environment is often limited or non-existent in current systems. This restricts users' ability to showcase their experiences and achievements on social media platforms, which is a crucial aspect of modern online engagement and self-expression.

In summary, there is a need for an improved system and method that enables users to interact with hyper-realistic digital replicas of content creators in immersive virtual environments while receiving real-time, personalized feedback and the ability to capture and share their experiences seamlessly. The present invention addresses these limitations by providing a novel approach that leverages advanced technologies, such as neural networks, computer vision, and generative AI, to create a highly immersive, interactive, and personalized experience for users engaging with digital replicas of their favorite content creators.

SUMMARY

The present invention addresses the need for an improved system and method that enables users to interact with hyper-realistic digital replicas of content creators in immersive virtual environments. The invention captures a user's image using a camera on a user device, processes the video feed using neural networks to isolate the user's image, and imports it into a virtual environment. The user's image is displayed interacting with a hyper-realistic digital replica of a content creator, whose movements are pre-recorded. The system tracks the user's movements, provides real-time feedback, and records interactions for sharing on social media. The invention utilizes advanced technologies such as neural networks, computer vision, and generative AI to create a highly immersive and personalized experience.

The system comprises a user device with a processor, memory, camera, display, and an application that executes the method steps. A server stores a library of digital replicas and their pre-recorded movements, transmits selected replicas to the user device, receives user interaction data, analyzes it to generate insights, and transmits the insights to content creators for optimization and monetization.

The plurality of neural networks used include a person/object detector, mask, depth, and body key joints detector. Texture handlers process video feed textures for masking and depth. A volumetric world creator generates multi-layered textures using generative AI, inserts them into a game engine, and configures layer distances. The application implements gameplay rules, tracks physical objects for virtual interaction, and provides real-time feedback for improving form and technique in physical activities. In summary, the present invention provides a novel solution for visualizing user interactions with hyper-realistic digital replicas in immersive virtual environments, offering a highly engaging and personalized experience while leveraging cutting-edge technologies.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth herein after.

BRIEF DESCRIPTION OF THE DRAWINGS

The various exemplary embodiments of the present invention. which will become more apparent as the description proceeds, are described in the following detailed description in conjunction with the accompanying drawings, in which.

DETAILED DESCRIPTION

Figure 1:
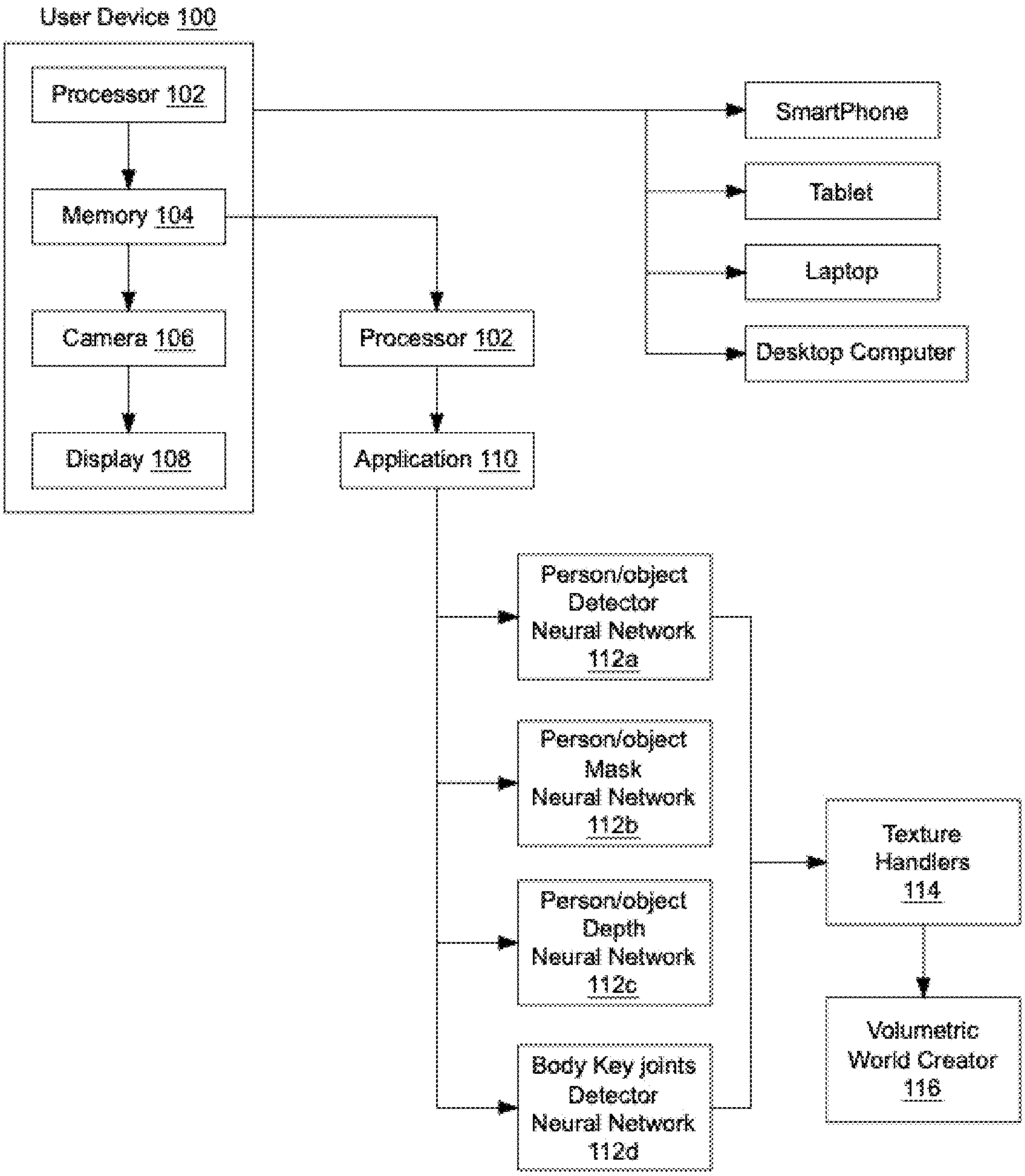
FIG. 1 is a system architecture diagram illustrating the key components and their interactions in the system.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms “a” and “an” and “the” and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein. each individual value is incorporated into the specification as if it were individually recited herein.

All systems described herein can be performed in any suitable order unless otherwise indicated herein or otherwise clearly contradicted by context. The use of any and all examples, or exemplary language (for example, “such as”) provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to “an element” can include two or more such elements unless the context indicates otherwise.

As used herein, the terms “optional” or “optionally” mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, “can,” “could,” “might.” or “may.” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

FIG. 1 is a system architecture diagram illustrating the key components and their interactions in the system for visualizing a user interacting with a hyper-realistic digital replica in an immersive virtual environment. The system comprises a user device 100 and a server 120 communicating over a network connection.

The user device 100 includes a processor 102, a memory 104, a camera 106, and a display 108. An application 110 is stored in the memory 104 and executed by the processor 102. The application 110 is configured to capture a real-time video feed of the user using the camera 106, which may be a built-in camera of a smartphone, tablet, laptop, or desktop computer, or an external camera connected to the user device 100.

The application 110 utilizes a plurality of neural networks to process the video feed. These neural networks include a person/object detector neural network **112*a* for detecting a person's body bounds from each frame, a person/object mask neural network 112*b* for generating a mask for each detected person, a person/object depth neural network 112*c* for generating a depth map for each detected person, and a body key joints detector neural network 112*d* for generating body points in 2D and/or 3D space for each detected person. The neural networks 112*a-d*** may be implemented using well-known architectures such as YOLOv8, Detectron2, MediaPipe, or custom-designed models.

Texture handlers 114 process the textures from the video feed to detect masking and depth, generating an isolated 2D representation of the user. This 2D representation is then imported into a virtual environment created by a volumetric world creator 116. The volumetric world creator 116 receives prompts describing the desired virtual environment and generates a multi-layered texture further detailed in FIG. 4. The generated texture is inserted into a game engine, such as Unreal Engine 5 or Unity, to construct the volumetric world with configurable distances between layers.

The application 110 displays the user's 2D representation interacting with a hyper-realistic digital replica of a content creator in the virtual environment on the display 108. The digital replica's movements are pre-recorded and stored on the server 120. The application 110 tracks the user's movements using the neural networks **112*a-d*** and compares them to the digital replica's movements to generate real-time feedback and guidance for improving form, technique, or synchronization during physical activities like dance, fitness, yoga, sports, or martial arts training.

Interactions between the user's 2D representation and the digital replica are recorded at user-defined key points and can be exported for sharing on social media platforms using a social media management API 118. The application 110 also implements gameplay rules governing these interactions within the virtual environment.

The server 120 includes a processor 122 and a memory 104 storing a library of hyper-realistic digital replicas of content creators along with their pre-recorded movements. The server 120 transmits a selected digital replica and its movements to the user device 100 for interaction with the user's 2D representation. It receives data on the user's movements and interactions from the user device 100, analyzes this data to generate insights on user engagement and preferences, and transmits these insights to content creators for optimizing their digital replica's performances and monetization strategies. The server 120 also optimizes the digital replica's texture quality based on the user device's display capabilities and screen size to maintain a hyper-realistic appearance while ensuring optimal performance.

The user device 100 can selectively utilize a GPU 126 or a CPU 128 for executing the neural networks based on its processing capabilities. This allows the system to run efficiently on a wide range of devices, from high-end gaming PCs to mobile phones with limited computing power.

In addition to tracking the user's body, the application 110 can track physical objects in the video feed, such as a chair or a prop, using object detection neural networks. Virtual representations of these objects are imported into the virtual environment, enabling interactions between the user's 2D representation, the digital replica, and the virtual objects. This feature enhances the immersive experience and allows for more diverse and engaging interactions.

The user device 100 with its camera 106, display 108, and application 110 enables the capture, processing, and visualization of the user's interactions with the digital replica in the virtual environment. The neural networks 112*a-d* and texture handlers 114 process the video feed to generate the user's isolated 2D representation. The volumetric world creator 116 generates the immersive virtual environment using generative AI models. The social media management API 118 allows for sharing interactions on social media platforms, while the application 110 implements gameplay rules governing the interactions.

The server 120 stores and transmits the digital replicas, receives and analyzes user interaction data, and optimizes the digital replica's texture quality based on the user device's capabilities. The selective use of GPU 126 or CPU 128 ensures optimal performance across different devices. The tracking and inclusion of physical objects in the virtual environment enhance the immersive experience, and the real-time feedback and guidance help users improve their performance in various physical activities.

Figure 2:
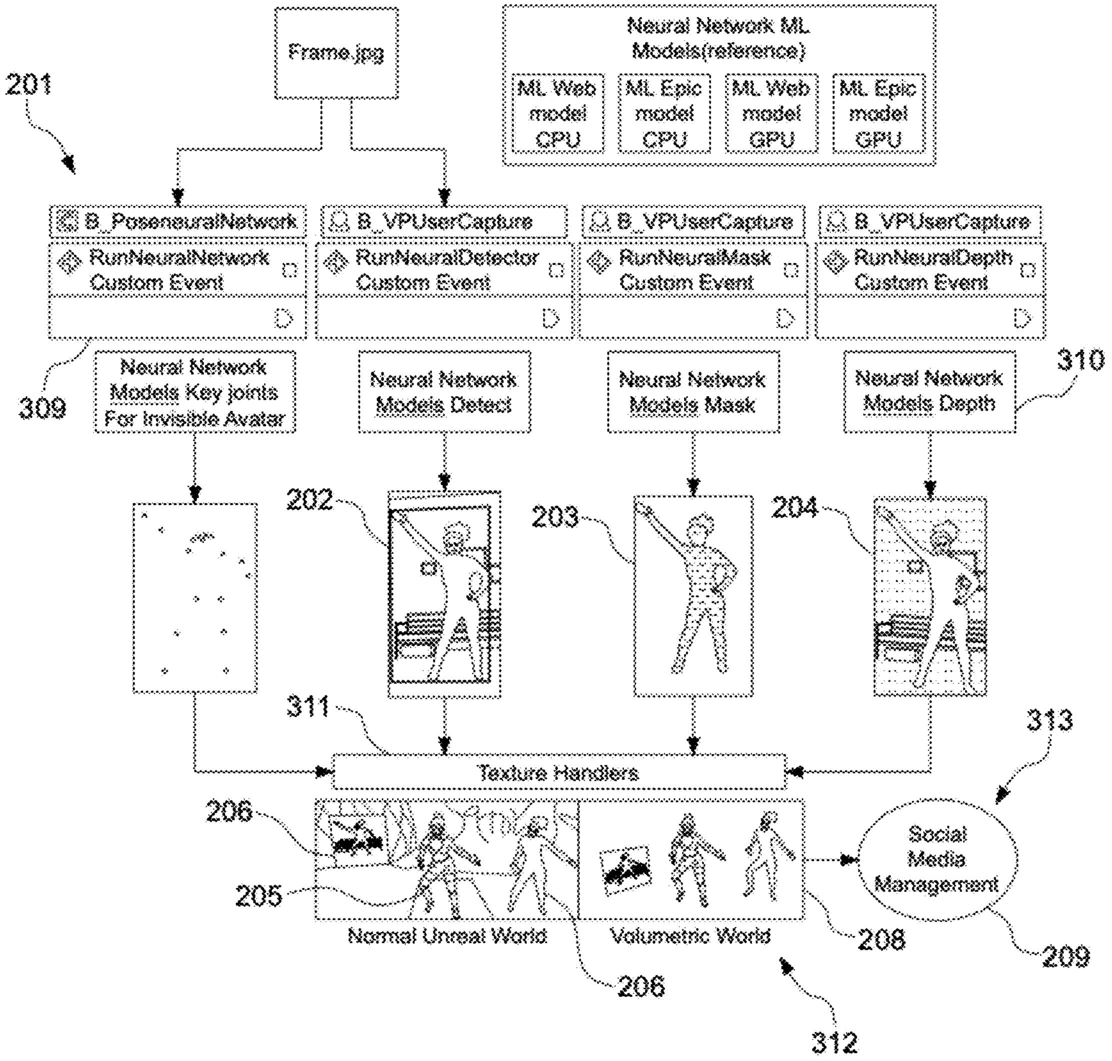
FIG. 2 is a flowchart illustrating the user interaction process in accordance with an embodiment of the present invention.

FIG. 2 is a flowchart illustrating the user interaction process in accordance with an embodiment of the present invention. The process begins with capturing a real-time video feed of the user using a camera of a user device (step 201). An application running on the user device employs a plurality of neural networks, to identify key variables from the video feed, including the user's body position, movements, and background (step 202). The application then removes the background from the video feed to isolate the user's image (step 203). This is achieved using a combination of person/object detector and mask neural networks, which generate a mask for each detection. Optionally, a depth neural network can be used to generate a depth map for each detection, enabling volumetric display of the user's image.

The isolated user's image is then imported into a virtual environment (step 204). The application creates an invisible avatar that follows the user's movements based on the 2D information and 3D joints detected by a body key joints detector neural network. Collision points are created to follow the user's movement, ensuring that the 2D plate representing the user always faces the front of the screen, even as the user rotates. The user's image is displayed in real-time, interacting with a hyper-realistic digital replica of a content creator in the virtual environment (step 205). The application tracks the user's movements in relation to the digital replica's pre-recorded movements using the plurality of neural networks (step 206) and generates real-time feedback to the user based on the comparison of their movements (step 207). This feedback may include guidance on how the user should adjust their movements to more closely match the digital replica's pre-recorded movements.

The application records interactions between the user's image and the digital replica in the virtual environment at user-defined key points (step 208). These recorded interactions can then be exported for sharing on social media platforms (step 209). The process may also involve capturing video feeds of additional users, importing their isolated images into the virtual environment, and displaying the images of the user and additional users interacting together with the digital replica. Generative AI can be utilized to create seamless interactions between the movements of the user, additional users, and the digital replica.

In some embodiments the application implements gameplay rules governing interactions between the user's image and the digital replica within the virtual environment. This may include tracking physical objects in the video feed, importing virtual representations of the tracked objects into the virtual environment, and enabling interactions between the user's image, the digital replica, and the virtual representations of the physical objects. Real-time feedback and guidance can be provided to the user for improving their form, technique, or synchronization with the digital replica during physical activities such as dance, fitness, yoga, sports, or martial arts training.

Figure 3:
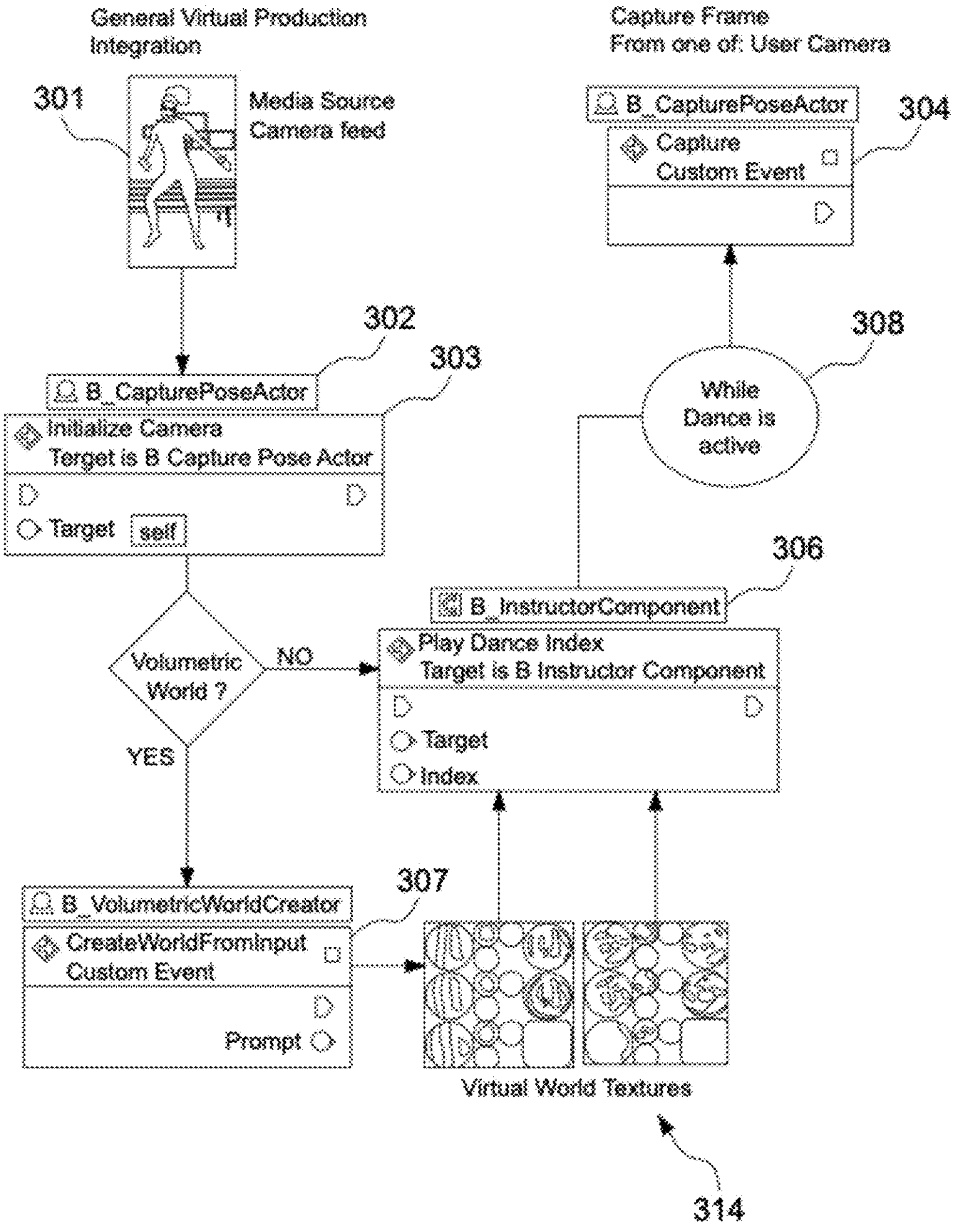
FIG. 3 is an application flow diagram illustrating the sequence of operations performed by the method for visualizing a user interacting with a hyper-realistic digital replica in an immersive virtual environment.

FIG. 3 is an application flow diagram illustrating the sequence of operations performed by the method for visualizing a user interacting with a hyper-realistic digital replica in an immersive virtual environment.

The process begins with a media source camera feed 301 capturing real-time video of the user. The B_CapturePoseActor component 302 utilizes a keyjoints detector, such as YoloV8, Detectron2, or MediaPipe models, to generate an invisible "avatar" for the user with multiple interaction points in the virtual world.

The application initializes the camera 303 to begin capturing footage. A custom event triggers 304 to start detecting specific user poses or actions from the camera feed.

If a volumetric world is not required, the B_InstructorComponent 306 plays a predefined dance index or instruction sequence. However, if a volumetric world is needed, the CreateWorldFromInput component 307 takes a user prompt and utilizes virtual world textures to generate a custom virtual environment using generative AI tools like Holovolo. The resulting world texture is inserted into the game engine, such as Unreal Engine 5.3+, and layer distances are configured. The generated volumetric world is then passed to the B_InstructorComponent 306.

While the dance is active, the B_CapturePoseActor neural network body keyjoints detector 308 generates body points in 2D and/or 3D space for each frame. This information is parsed and processed by various integrated neural networks. The neural network integration 309 includes:

B_VPUserCapture-NeuralNetwork Person/Object detector: Detects person/object bounds from the frame using ML models like YoloV8 running on the CPU.

B_VPUserCapture-NeuralNetwork Person/Object mask: Generates a mask for each detection using ML web models running on the GPU.

B_VPUserCapture-NeuralNetwork Person/Object depth: Generates a depth map for each detection using ML web models on the GPU.

B_CapturePoseActor NeuralNetwork Body Keyjoints detector: Generates body keypoints in 2D/3D space using ML web models on the CPU.

The neural network processes produce different visual outputs 310 comprising: outlined figure of the detected person; person mask showing the figure in white against a black background; and depth map using color coding for improved 3D rendering.

Texture handlers 311 process the video feed textures for detecting masking and depth to obtain the isolated 2D user representation. If a volumetric world is required, the process diverts to creating it using the processed textures and world models 312, which are then fed into the virtual environment.

The Social Management API 313 interacts with the application to capture screenshots during gameplay for a photo session. Gameplay rules 314 govern the interactions between the user's 2D avatar and the instructor avatar within the virtual world. The process can also export the volumetric world for sharing on social media platforms.

The application utilizes OpenCV for image manipulation of the video feed. Real-time feedback is generated to guide the user on adjusting their movements to match the digital replica's pre-recorded movements. Music played in the virtual environment can be synchronized with external smart devices.

The method supports capturing video feeds of multiple users, isolating their images, and displaying them interacting together with the digital replica in the virtual environment. Generative AI, such as ONNX models in Unreal Engine and JavaScript, is used to create seamless interactions between the movements of the users and the digital replica.

The application can customize the neural networks based on the user device's processing capabilities to optimize performance. The digital replica can be a hyper-realistic representation of a celebrity, influencer, artist, or athlete.

Recorded interactions exported for social media sharing include automatically selected highlights based on key moments, as per claim 13. The user is provided with the option to participate in live training sessions with a real instructor after completing the interaction with the digital replica.

The method also supports tracking physical objects in the video feed, importing their virtual representations into the virtual environment, and enabling interactions between the user's image, digital replica, and virtual objects.

The application is developed using Unreal Engine 5.3+ and leverages the ONNX framework for integrating machine learning models. Python notebooks in Anaconda are used for troubleshooting, while the source code is managed in a Git repository with LFS. C++ code is written in Visual Studio Community 2022, and the Chromium engine is used for web view integration. Optional plugins from the Unreal Engine Marketplace can also be incorporated.

Figure 4:
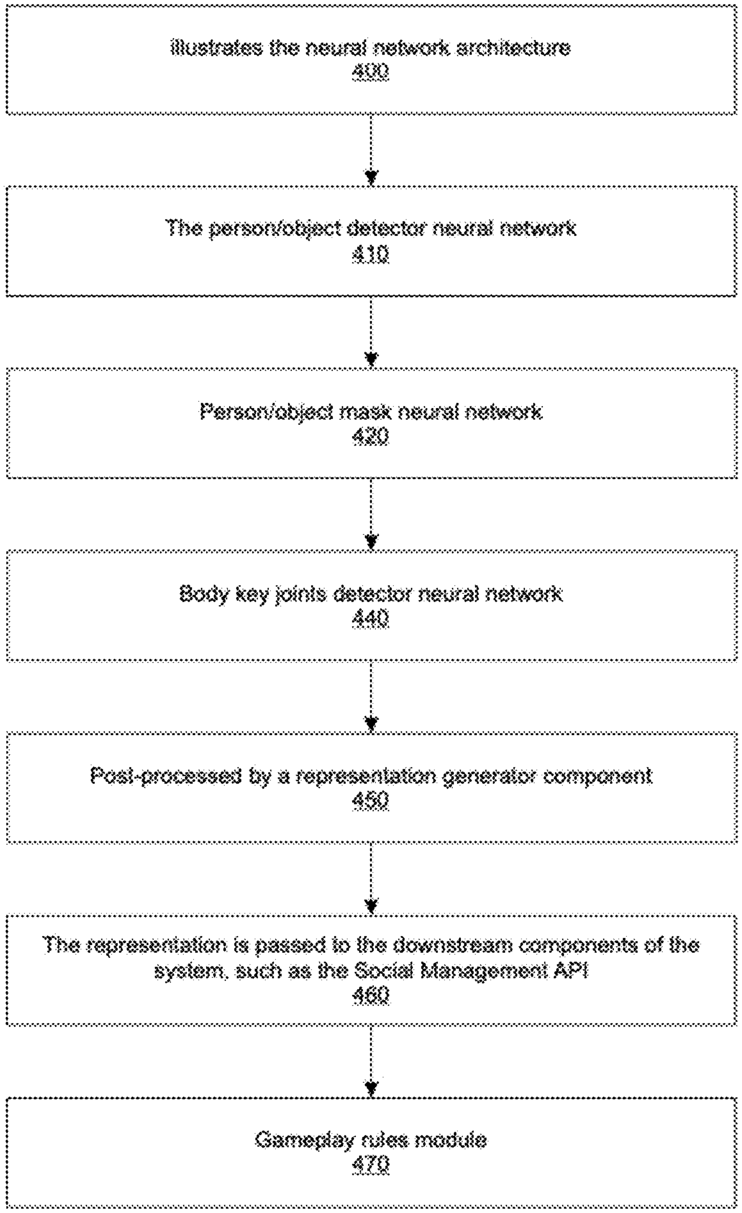
FIG. 4 illustrates the neural network architecture.

FIG. 4 illustrates the neural network architecture 400 used in the present invention for analyzing the video feed to detect and track persons and objects. The architecture comprises a plurality of specialized neural networks that work together to perform the required analysis.

The person/object detector neural network 410 is configured to detect a person's body bounds and objects from each frame of the video feed. In one embodiment, the detector is implemented using the YOLOv8 object detection model. YOLOv8 is a state-of-the-art, real-time object detection model that uses a single neural network to predict bounding boxes and class probabilities directly from full images in one evaluation. The model is pre-trained on the Common Objects in Context (COCO) dataset which includes person and object classes. Alternatively, the detector 410 may be implemented using other object detection architectures such as Detectron2, a versatile object detection platform developed by Facebook AI Research, or a custom neural network architecture designed and trained for person and object detection.

The output of the detector 410, which includes bounding boxes for each detected person and object, is fed into a person/object mask neural network 420. The mask network 420 is configured to generate a precise pixel-wise mask for each detected person and object, segmenting them from the background. This allows for more fine-grained analysis of the detected persons/objects. In one implementation, the mask network 420 uses the Mask R-CNN architecture, which extends the Faster R-CNN object detection model by adding a branch for predicting segmentation masks in parallel with bounding box recognition. The Detectron2 platform includes an optimized implementation of Mask R-CNN.

In parallel with mask generation, a person/object depth neural network 430 estimates the depth of each detected person/object, generating a depth map. The depth network 430 takes the cropped bounding box images from the detector 410 and predicts a dense depth map for each one. One possible implementation leverages a CNN architecture specifically designed and trained for monocular depth estimation from RGB images. The depth maps provide 3D spatial information in addition to the 2D bounding boxes and masks.

Additionally, a body key joints detector neural network 440 is used to estimate the pose of each detected person by localizing key body joints. The network 440 takes each cropped person bounding box and generates a set of body key points in 2D image space, such as shoulders, elbows, wrists, hips, knees, and ankles. Optionally, the 3D positions of the joints can be estimated by combining the 2D key points with the depth map information. The key joints detector 440 can be implemented using the MediaPipe Pose model, which employs a two-step detector-tracker ML pipeline. The detector is a CNN model based on MobileNetV2 that predicts key point locations within the person bounding box. The tracker is a lightweight model that uses the key point predictions from the previous frame to localize key points in the current frame.

The outputs of the person/object detector neural network 410, person/object mask neural network 420, person/object depth neural network 430, and body key joints detector neural network 440 are combined and post-processed by a representation generator component 450 to produce a comprehensive representation of each person and object detected in the video feed. The representation generator 450 first associates the bounding boxes, pixel-wise masks, depth maps, and body key point locations for each unique person/object instance across the neural networks by matching their spatial coordinates and dimensions.

Next, the representation generator 450 applies a series of image processing techniques using the OpenCV library to refine the results. The masks are upscaled to the original image resolution using bilinear interpolation and morphological operations, such as erosion and dilation, are performed to smooth the mask boundaries. The depth maps are normalized and filtered using a bilateral filter to reduce noise while preserving edges. The 2D body key point locations are transformed into 3D coordinates by projecting them onto the corresponding depth map values using camera intrinsic parameters.

Finally, the representation generator 450 formats the post-processed data into a structured representation for each detected person/object, such as a JSON object. The representation includes the refined bounding box coordinates, pixel-wise mask as a binary image, depth map as a grayscale image, and 3D body key point locations. This comprehensive representation provides a rich set of features for analyzing the interactions between the user's avatar and the instructor avatar within the virtual environment. The representation is passed to the downstream components of the system, such as the Social Management API 460 and gameplay rules module 470, to enable realistic and engaging interactions with the hyper-realistic digital replica.

Figure 5:
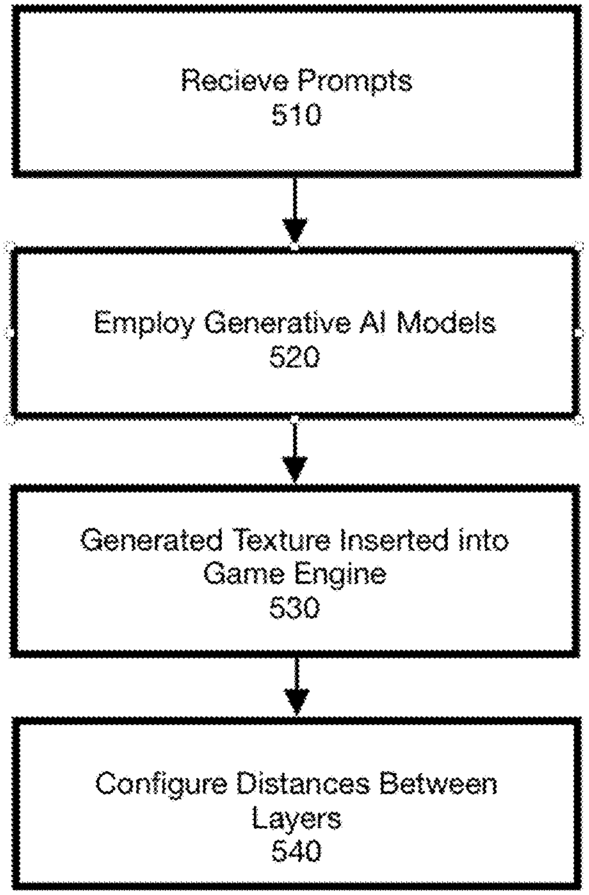
FIG. 5 is an application flow diagram illustrating the process of creating a volumetric world.

FIG. 5 is an application flow diagram illustrating the process of creating a volumetric world using the volumetric world creator component of the present invention. The process begins with the volumetric world creator receiving prompts describing the desired characteristics and features of the volumetric world to be generated (step 510). These prompts may include descriptions of the environment, objects, characters, and other elements that should be included in the volumetric world.

Upon receiving the prompts, the volumetric world creator employs generative AI models to generate a multi-layered texture representing the desired volumetric world (step 520). The generative AI models may utilize existing tools and AI models, such as those provided by platforms like holotv, to create a texture with different depth layers combined into a single texture asset. The AI models are trained on vast datasets of images and 3D models, enabling them to generate highly detailed and realistic textures based on the provided prompts.

The multi-layered texture generated by the AI models is then inserted into a game engine to construct the volumetric world (step 530). The game engine, such as Unity or Unreal Engine, is responsible for rendering the volumetric world and managing the interactions between objects and characters within the environment. The multi-layered texture is applied to a 3D mesh or a set of planes positioned at different depths within the game engine, creating the illusion of a volumetric space.

After inserting the multi-layered texture into the game engine, the volumetric world creator configures the distances between the layers of the volumetric world (step 540). This step involves setting the positions and spacing of the planes or 3D mesh layers to achieve the desired depth and parallax effect. The distances between layers can be adjusted to create a sense of depth and to control the visibility of objects at different distances from the viewer. Some layers may be positioned between objects to enhance the volumetric perception of the scene.

The volumetric world creator may utilize various software methods and libraries to implement the generation and configuration of the volumetric world. For example, it may use deep learning frameworks such as TensorFlow or PyTorch to train and execute the generative AI models. It may also leverage graphics libraries like OpenGL or DirectX to render the volumetric world within the game engine.

B_ComparePoseActor: As used herein, the term "B_ComparePoseActor" refers to an actor configured to capture normalized Neural Network data and compare current Instructor animation pose predictions, which are pre-recorded, against a current user prediction pose. The B_ComparePoseActor includes a B_PoseComparer Component and a B_PoseDrawer Component, and is configured to perform comparisons against data from a Camera capturing a Human Player, Videos, or Bots.

B_PoseComparer Component: As used herein, the term "B_PoseComparer Component" refers to an Unreal Engine component that manages comparison logic against a current prediction. For a current animation montage and a frame capture time, the B_PoseComparer Component is configured to retrieve pre-recorded predictions to establish a comparison within a time window, such as 1 second before or after the frame capture time, to predict if a user performed a correct position or is out of sync, and to generate analytics based on the comparison.

B_PoseDrawer Component: As used herein, the term "B_PoseDrawer Component" refers to a component configured to visualize key joints and a correct position, primarily for debugging purposes.

Figure 6:
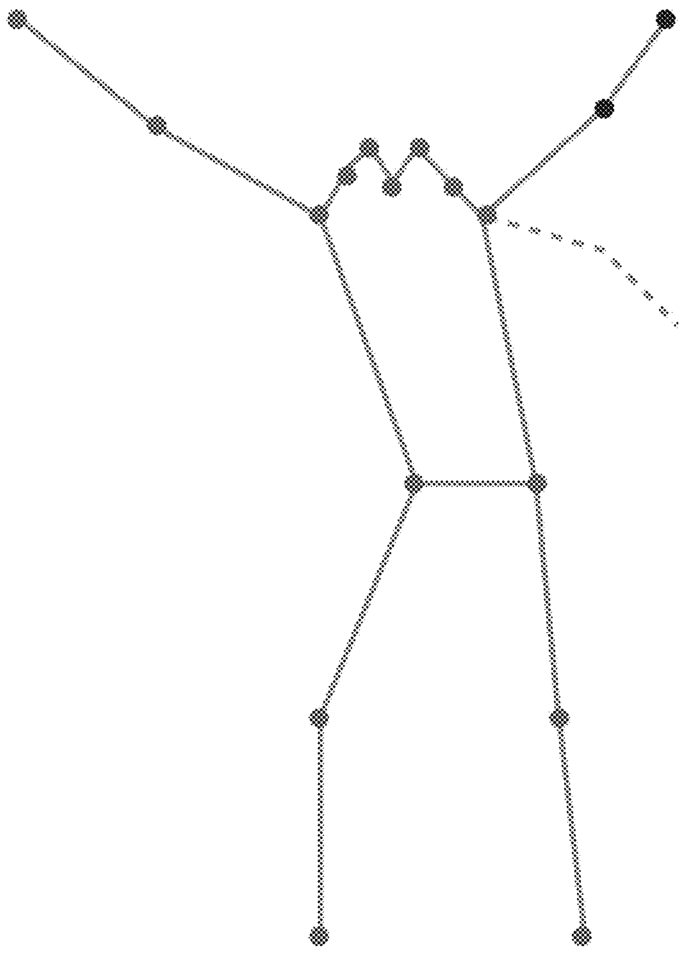
FIG. 6 illustrates an example of the present invention rendering joint colors based on comparison results, indicating a bad position.

FIG. 6 illustrates an example of the present invention rendering joint colors based on comparison results, indicating a bad position. In this embodiment, the user's pose is captured and compared to the pre-recorded instructor's movements. The B_ComparePoseActor component analyzes the comparison results and determines that the user's position deviates significantly from the expected pose. Consequently, the B_PoseDrawer component renders the color of the joints as red, providing clear visual feedback to the user that their current position is incorrect and requires adjustment. The red color serves as an indication that the user's pose does not match the instructor's movements and needs to be corrected to achieve the desired performance.

Figure 7:
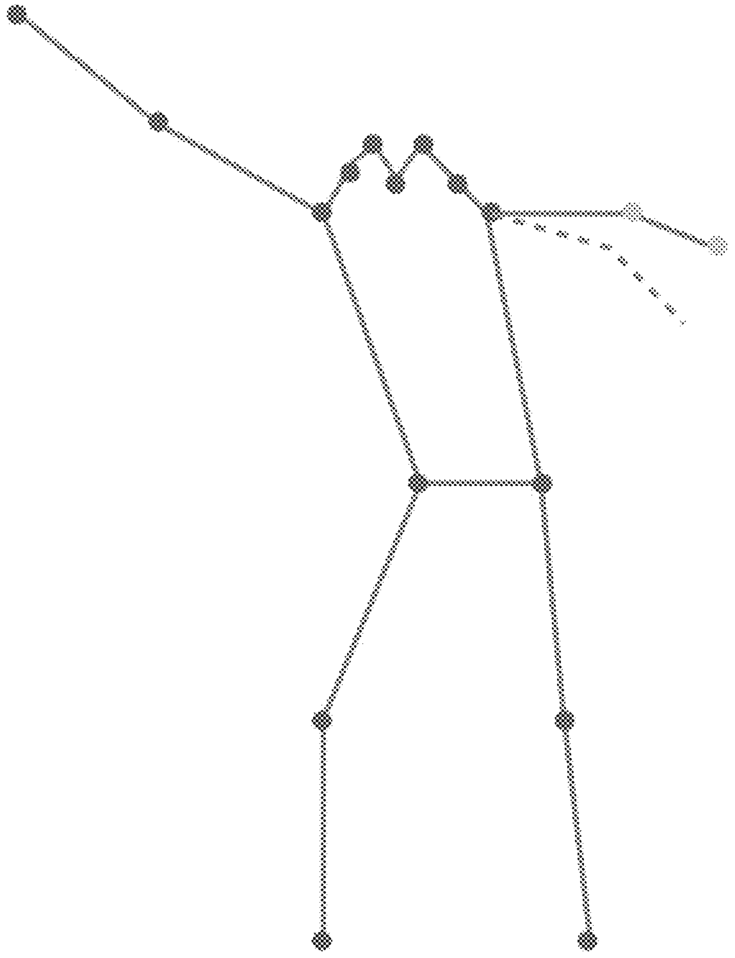
FIG. 7 depicts an example of the present invention rendering joint colors based on comparison results, indicating a warning position.

FIG. 7 depicts an example of the present invention rendering joint colors based on comparison results, indicating a warning position. In this scenario, the user's pose is captured and compared to the pre-recorded instructor's movements. The B_ComparePoseActor component analyzes the comparison results and determines that the user's position is close to the expected pose but still requires minor adjustments. As a result, the B_PoseDrawer component renders the color of the joints as yellow, providing visual feedback to the user that their current position is nearly correct but needs some refinement. The yellow color serves as a cautionary indication that the user's pose is close to the desired position but requires further modification to achieve optimal alignment with the instructor's movements.

Figure 8:
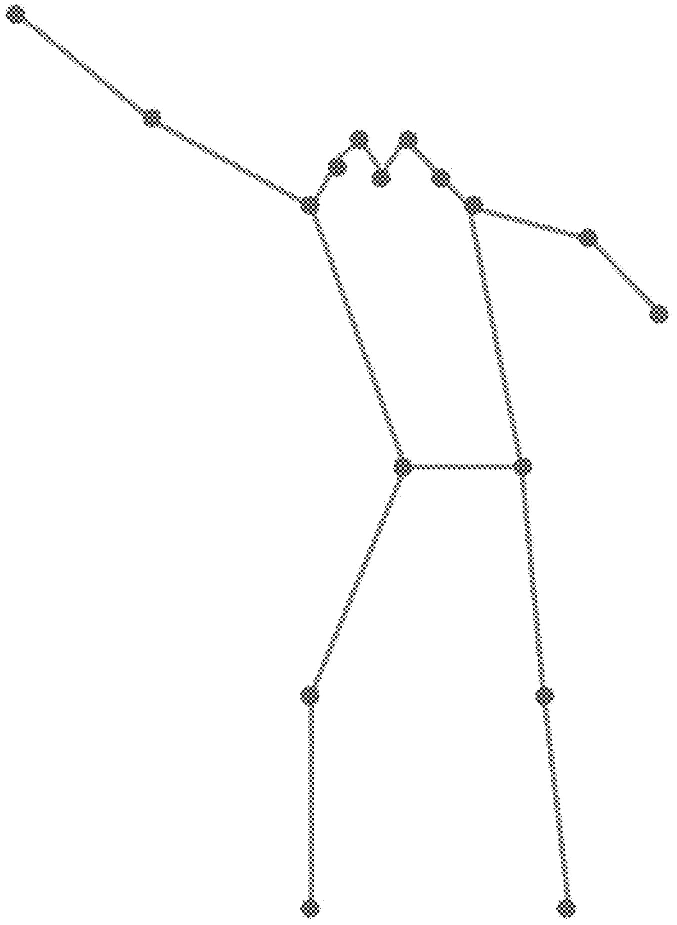
FIG. 8 shows an example of the present invention rendering joint colors based on comparison results, indicating a coincidence position.

FIG. 8 shows an example of the present invention rendering joint colors based on comparison results, indicating a coincidence position. In this case, the user's pose is captured and compared to the pre-recorded instructor's movements. The B_ComparePoseActor component analyzes the comparison results and determines that the user's position closely matches the expected pose. Consequently, the B_PoseDrawer component renders the color of the joints as green, providing positive visual feedback to the user that their current position is correct and aligns well with the instructor's movements. The green color serves as a clear indication that the user's pose is accurate and coincides with the desired performance, encouraging the user to maintain the correct position and continue with the exercise or dance routine.

Figure 9:
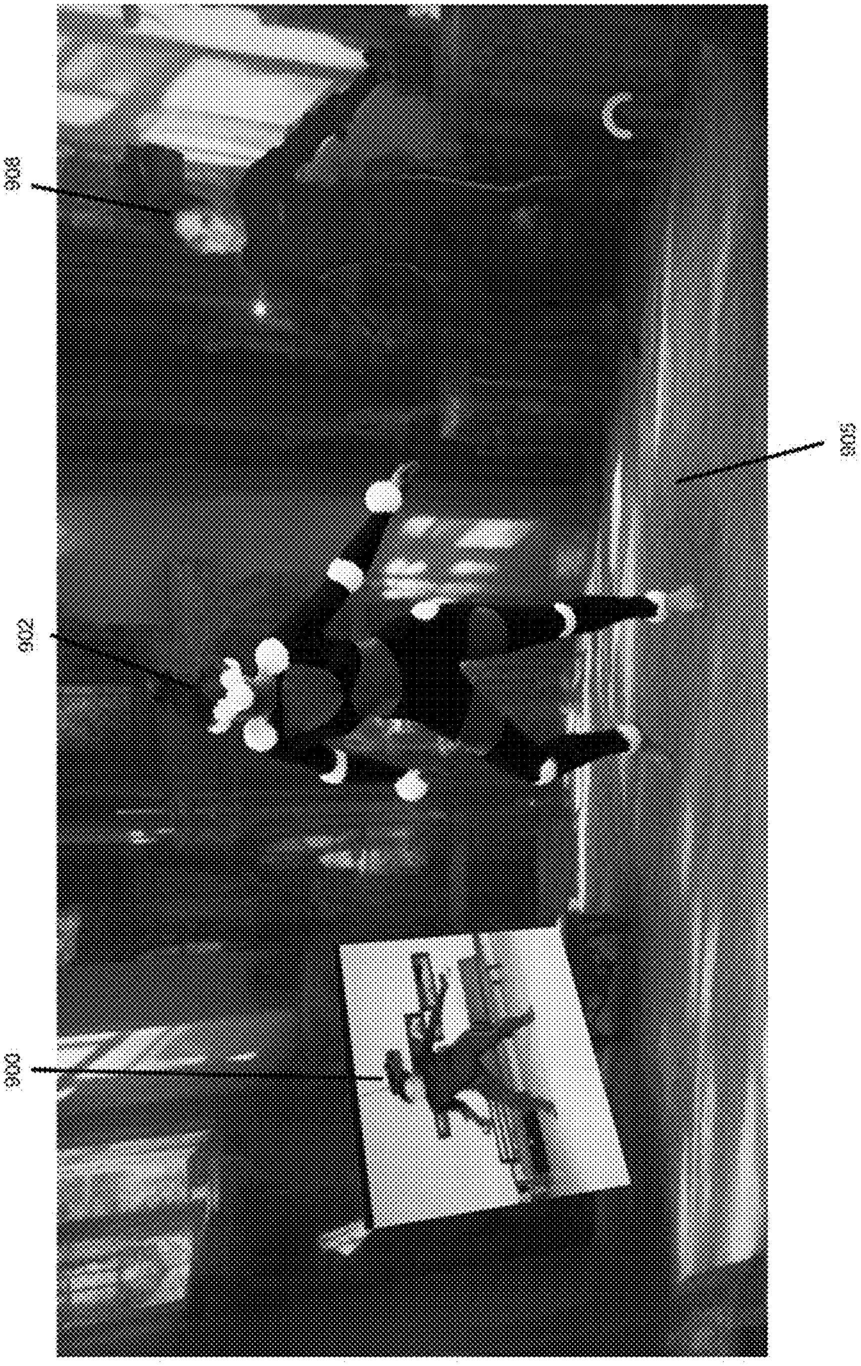
FIG. 9 illustrates an embodiment of the invention where a user visualizes themselves interacting with an avatar teacher in a virtual world.

FIG. 9 illustrates an embodiment of the invention where a user 900 visualizes themselves interacting with an avatar teacher 902 in a virtual world. The virtual world may be a volumetric world 904 created using user input and generative AI prompts, such as "Tower Interior" or "Sunny day on Beach." Volumetric worlds 904 are material-generated worlds with different depth layers, providing an immersive experience for the user 900. Alternatively, the virtual world may be an Unreal Engine world 906, which is a pre-designed map or environment.

In this embodiment, the user 900 is represented by a digital avatar 908 within the virtual world. The digital avatar 908 mimics the movements and actions of the user 900, allowing for intuitive interaction with the virtual environment. The avatar teacher 902 is a pre-programmed or AI-controlled character designed to guide and instruct the user 900 within the virtual world.

The user 900 and avatar teacher 902 may engage in various activities within the virtual world, such as pair dancing. The dancing and avatar interaction can occur on Volumetric Worlds 905 (Material generated worlds with different depth layers as outlined in FIG. 8) Volumetric Worlds can be created by user Input and using Generative AI prompts like "Tower Interior" or "Sunny day on Beach". The system captures the user's movements using sensors or cameras (not shown) and translates them into corresponding movements of the digital avatar 908. The avatar teacher 902 responds to the user's actions and provides real-time feedback and guidance to enhance the learning experience.

Figure 10:
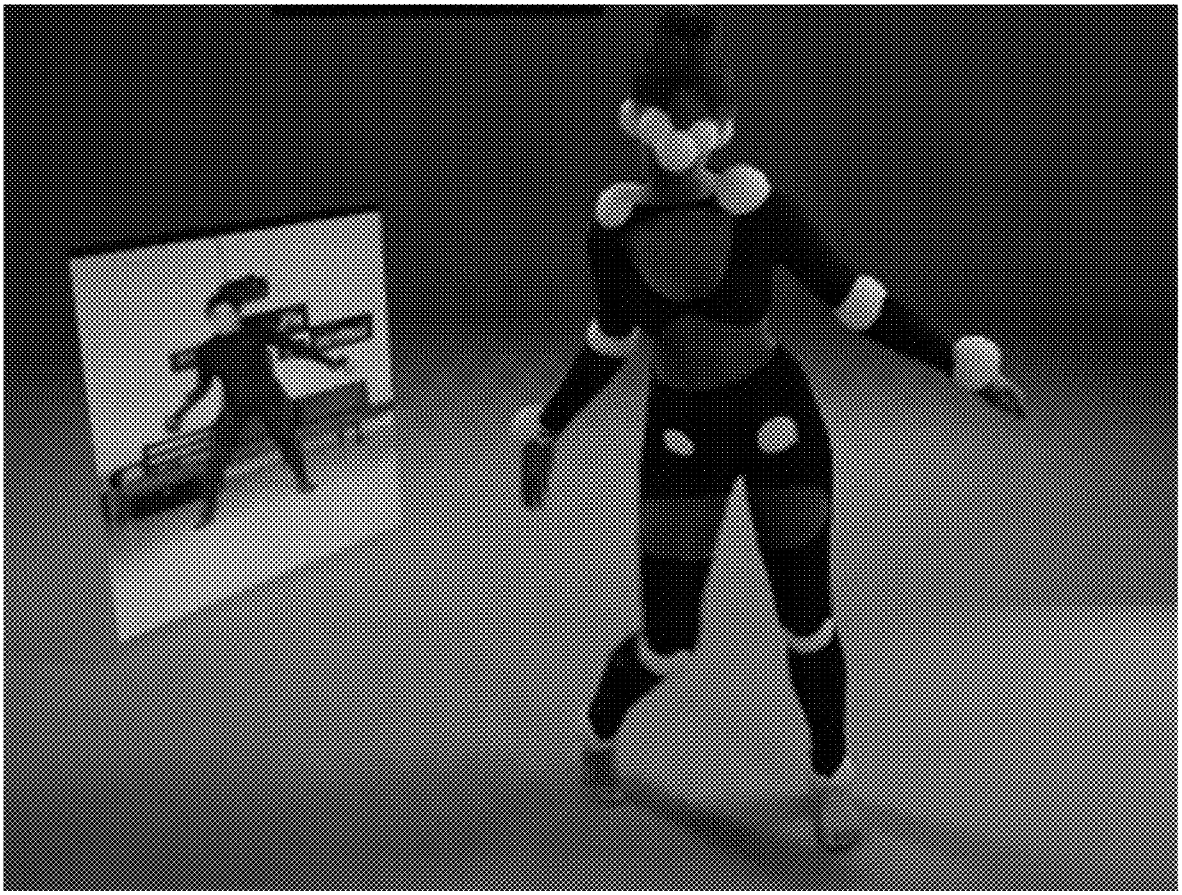
FIG. 10 illustrates an embodiment of a hyper-realistic avatar available to the user, which aids in the visualization of movement guidance.

FIG. 10 illustrates an embodiment of a hyper-realistic avatar available to the user, which aids in the visualization of movement guidance. The avatar is a digital representation of the instructor, created using advanced motion capture techniques and imported into a state-of-the-art game engine environment. The avatar is designed to closely mimic the appearance and movements of the instructor, providing a highly immersive and personalized learning experience for the user.

The avatar is depicted in a neutral stance, with its arms slightly bent at the elbows and its legs shoulder-width apart. The avatar's facial features, hair, and clothing are meticulously detailed to resemble those of the instructor, enhancing the realism of the digital representation. The avatar's body proportions and musculature are accurately modeled based on the instructor's physique, ensuring that the movements and poses demonstrated by the avatar closely match those of the instructor. By leveraging the hyper-realistic avatar, the present invention offers a highly engaging and effective means of delivering personalized, automated feedback and instruction to users.

In a further embodiment the system enables users to bring real-world objects into the virtual environment, enhancing the immersive experience and enabling more diverse interactions between the user's 2D representation, the digital replica, and the virtual objects.

The application running on the user device utilizes object detection neural networks, to detect and classify real-world objects in the video feed captured by the camera. These objects can include animals, cars, chairs, toys, and other common household items.

When a supported object is detected, the application employs instance segmentation techniques, such as Mask R-CNN, to generate a precise mask for the object. This mask is used to isolate the object from the background, creating a clean 2D representation suitable for importing into the virtual environment.

To determine the object's 3D position and orientation relative to the user, the application applies depth estimation algorithms, such as MiDaS or MonoDepth, to the video feed. These algorithms analyze visual cues and patterns to infer the distance between the camera and the object, generating a depth map that can be used to place the object accurately within the virtual environment.

The application then processes the object's texture using the texture handlers, which apply image processing techniques to optimize the texture quality and ensure a seamless integration with the virtual environment. This may involve adjusting the object's lighting, color balance, and resolution to match the aesthetic of the virtual world.

The processed 2D representation of the real-world object is then imported into the virtual environment created by the volumetric world creator. The object's position, orientation, and scale are adjusted based on the depth information and the user's perspective, ensuring that the object appears correctly placed within the virtual world.

Once the real-world object is integrated into the virtual environment, the application 110 enables interactions between the user's 2D representation, the digital replica, and the virtual object. For example, if the user brings a chair into the virtual environment, the digital replica can be prompted to sit on the chair, creating a more engaging and immersive experience.

These interactions are governed by the gameplay rules implemented in the application, which define the behavior and responses of the digital replica and the virtual objects based on the user's actions. The rules can be customized to suit different scenarios and objectives, such as having the digital replica pet a virtual dog or dance on a table.

The interactions between the user, the digital replica, and the virtual objects are recorded at user-defined key points and can be exported for sharing on social media platforms using the social media management API. This allows users to showcase their unique experiences and creations, fostering a sense of community and encouraging others to engage with the application.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A method for visualizing a user interacting with a hyper-realistic digital replica in an immersive virtual environment, the method comprising:

capturing, by a camera of a user device, a real-time video feed of the user;

identifying, by an application running on the user device and using a plurality of neural networks, key variables comprising the user's body position, movements, and background from the video feed;

removing, by the application, the background from the video feed to isolate the user's image;

importing, by the application, the isolated user's image into a virtual environment;

displaying, by the application and in real-time, the user's image interacting with a hyper-realistic digital replica of a content creator in the virtual environment;

tracking, by the application and using the plurality of neural networks, the user's movements in relation to the digital replica's pre-recorded movements;

generating, by the application, real-time feedback to the user based on the comparison of the user's movements to the digital replica's movements;

recording, by the application and at user-defined key points, interactions between the user's image and the digital replica in the virtual environment; and exporting, by the application, the recorded interactions for sharing on social media platforms.

2. The method of claim 1, wherein the plurality of neural networks comprises a body detector neural network, an object detector neural network, and a pose estimation neural network.

3. The method of claim 1, wherein the application utilizes OpenCV for image manipulation of the video feed.

4. The method of claim 1, wherein the real-time feedback comprises guidance on how the user should adjust their movements to more closely match the digital replica's pre-recorded movements.

5. The method of claim 1, further comprising synchronizing music played in the virtual environment with external smart devices.

6. The method of claim 1, further comprising:

capturing video feeds of a plurality of additional users;

importing the isolated images of the additional users into the virtual environment; and displaying the images of the user and additional users interacting together with the digital replica in the virtual environment.

7. The method of claim 6, further comprising utilizing generative artificial intelligence (AI) to create a seamless interaction between the movements of the user, additional users, and digital replica.

8. The method of claim 1, wherein the application is configured to customize the neural networks based on the processing capabilities of the user device to optimize performance.

9. The method of claim 1, wherein the digital replica is a hyper-realistic representation of a celebrity, influencer, artist, or athlete.

10. The method of claim 1, wherein the recorded interactions exported for social media sharing comprise highlights automatically selected by the application based on key moments.

11. The method of claim 1, further comprising providing the user with an option to participate in a live training session with a real instructor after completing the interaction with the digital replica.

12. The method of claim 1, wherein the plurality of neural networks comprises:

a person/object detector neural network configured to detect a person's body bounds from each frame of the video feed;

a person/object mask neural network configured to generate a mask for each detected person;

a person/object depth neural network configured to generate a depth map for each detected person; and a body key joints detector neural network configured to generate body points in 2D and/or 3D space for each detected person.

13. The method of claim 1, further comprising processing, by texture handlers, textures from the video feed for detecting masking and depth to generate the isolated user's image.

14. The method of claim 1, further comprising:

receiving prompts describing a desired volumetric world;

generating, using generative artificial intelligence (AI) models, a multi-layered texture representing the desired volumetric world;

inserting the generated multi-layered texture into a game engine to construct the volumetric world; and configuring distances between the layers of the volumetric world.

15. The method of claim 1, further comprising implementing gameplay rules governing interactions between the user's image and the digital replica within the virtual environment.

16. The method of claim 1, further comprising:

tracking one or more physical objects in the video feed;

importing virtual representations of the tracked physical objects into the virtual environment; and enabling interactions between the user's image, the digital replica, and the virtual representations of the physical objects.

17. The method of claim 1, further comprising providing real-time feedback and guidance to the user for improving their form, technique, or synchronization with the digital replica during physical activities comprising dance, fitness, yoga, sports, or martial arts training.

* * * * *